United States Patent [19]

Smith

[11] Patent Number: 5,067,515

[45] Date of Patent: Nov. 26, 1991

[54] COMPACT SPRAY GUN

[75] Inventor: James E. Smith, St. Petersburg, Fla.

[73] Assignee: Graves Spray Supply, Inc., Clearwater, Fla.

[21] Appl. No.: 538,737

[22] Filed: Jun. 15, 1990

Related U.S. Application Data

[62] Division of Ser. No. 436,026, Nov. 14, 1989, Pat. No. 4,948,048, which is a division of Ser. No. 330,460, Mar. 30, 1989, Pat. No. 4,925,104, which is a division of Ser. No. 150,142, Jan. 29, 1988, Pat. No. 4,848,665.

[51] Int. Cl.$^5$ .......... F16K 51/00

[52] U.S. Cl. .......... 137/327; 137/329.01; 251/363

[58] Field of Search .......... 251/359, 360, 363; 137/327, 328, 329.01

[56] References Cited

U.S. PATENT DOCUMENTS

| | | | |
|---|---|---|---|
| 2,740,670 | 4/1956 | Harder | 299/140.1 |
| 3,302,891 | 2/1967 | Faro et al. | 239/407 |
| 3,330,484 | 7/1967 | Johnson et al. | 239/414 |
| 3,458,137 | 7/1969 | Behr | 239/414 |
| 3,799,403 | 3/1974 | Probst et al. | 222/135 |
| 3,801,009 | 4/1974 | Marshall, III | 239/9 |
| 3,873,023 | 3/1975 | Moss et al. | 239/3 |
| 4,023,733 | 5/1977 | Sperry | 239/112 |
| 4,169,545 | 10/1979 | Decker | 222/136 |
| 4,376,526 | 3/1983 | Freeman | 251/360 |
| 4,392,633 | 7/1983 | Van Winkle | 251/122 |
| 4,471,887 | 9/1984 | Decker | 222/135 |
| 4,635,852 | 1/1987 | Muhlnickel, Jr. | 239/414 |
| 4,749,128 | 6/1988 | Smith | 239/414 |
| 4,778,083 | 10/1988 | Decker | 222/144.5 |
| 4,867,346 | 9/1989 | Faye et al. | 222/145 |

FOREIGN PATENT DOCUMENTS

| | | | |
|---|---|---|---|
| 626830 | 9/1927 | France | 251/360 |
| 18993 | of 1906 | United Kingdom | 251/360 |

*Primary Examiner*—A. Michael Chambers
*Attorney, Agent, or Firm*—Barnes & Thornburg

[57] ABSTRACT

A compact spray gun using a single air supply port to actuate two piston valves and act as an air refinement system. An externally adjustable cartridge type packaging assembly needle piston valve seals the resin. A spool valve portion of a catalyst piston valve having O-ring seals is separable external from the piston portion. Leak detection ports are provided so the operator can easily determine when to adjustment or replacement of the packing or O-ring seals. The catalyst piston valve controls the mixing of the catalyst and air from a second air supply port. In a preferred embodiment, the resin piston valve controls a valve which provide air to the chopper system simultaneously with spraying of the resin.

2 Claims, 3 Drawing Sheets

COMPACT SPRAY GUN

This is a divisional of application Ser. No. 07/436,026, filed Nov. 14, 1989, now U.S. Pat. No. 4,948,048, issued Aug. 14, 1990, which is a divisional of Ser. No. 07/330,460, filed Mar. 30, 1989, which issued May 15, 1990 as U.S. Pat. No. 4,925,104 and which is a divisional of Ser. No. 07/150,142, filed Jan. 29, 1988, which issued on July 18, 1988, as U.S. Pat. No. 4,848,665.

BACKGROUND AND SUMMARY OF THE INVENTION

The present invention relates generally to fluid spray guns and more particularly to compact multi-fluid component spray guns for use in low pressure, airless nozzle fiberglass spraying systems with external resin catalyst mixing.

Fiberglass spraying devices, and particularly hand held units, have previously employed a number of different spraying methods in attempts to provide well-mixed, properly shaped fluid spray flows in the most efficient manner possible. Typical fiberglass spraying apparatus supply fluid resin and fluid catalyst to a nozzle for internal or external mixing. With internal mixing, catalyst fluid may typically first be atomized by mixing with air and then directed into the path of the fluid resin at the nozzle interior. After resin-catalyst mixing, the resulting fluid is forced through a common nozzle and directed at the work piece. Internal mixing requires time consuming and expensive cleaning of the nozzle and mix chambers after each use.

With external mixing, both catalyst and resin fluids may typically be forced though separate spray nozzles prior to mixing. These nozzles are directed such that the catalyst and resin spray flows intersect to permit mixing prior to contact with the work piece. If the resin is not atomized prior to spraying, the process is often called "airless". Such external mixed sprayers may not need extensive cleaning after each use, but typically require high fluid pressures. Reinforcing fibers may typically be directed into the mixed spray path of either internal or external mix sprayers to be wetted thereby and carried to the work piece.

Major concerns in designing and operating fiberglass sprayers include providing a thoroughly mixed spray, to assure proper curing and work piece uniformity, as well as larger transfer efficiencies and lower operating costs. The term "transfer efficiencies" refers to the amount of material applied and adhering to the work product compared with the amount of waste material left in the atmosphere or elsewhere, such as the floor of the production room. Since fiberglass resin and catalyst materials are expensive and catalyst and spray mixture fumes present serious health hazards for production personnel, it is desirable to achieve as high a transfer efficiency as possible. Operating costs may be reduced by, for example, decreasing the amount of down time for system maintenance, repair, or cleaning and lowering the pumping pressure capacity needed. Further, if the spray flow fan is properly configured, production time itself may be reduced.

In prior fiberglass sprayers, a trigger mechanism operates a single piston which typically controls the flow of resin and catalyst to a mixing chamber. The piston works with either external or internal mixing chambers. In order to open both the resin and catalyst valves, a large piston is required to obtain sufficient forces for the opening. The valves are connected to this piston by connecting rods. If the connecting rod becomes kinked, the valve has a tendency to stick or stay open. When the trigger is released, spring mechanisms force the valves to a closed position. If the valve becomes sticky, the springs have a tendency not to completely close the valve mechanism and leaking of resin and/or catalyst is possible.

Also these single piston guns require a large piston, making the guns very heavy to handle. Upon operation over a long period of time, the operator can become fatigued and not apply the spray flow to the work piece properly.

After using these prior spray guns for a long period of time, the packing or O-rings become worn and need repair. In order to repair prior art spray guns, the guns have to be taken apart and the packing redone. When O-rings are used, the guns have to be completely disassembled with the interior portions removed and new O-rings provided to the sealing ports. This task was often time-consuming and difficult for a typical operator to undertake. Therefore, it is possible that a number of extra spray guns are needed in an operation so that the employees would always have an operating gun while others are being repaired.

If the operator did not realize that the seals were becoming worn, he could continue to apply the mixture to a work piece wherein the mixture was not of the proper proportions because of leaking of the seals. Also, the gun can be damaged by allowing pressure to accumulate in a portion of the gun.

When the leak is found and it is decided that the seal needs to be replaced, the gun has to be disassembled, and the remaining seal material cleaned out by digging into a component of the gun. This is both a time consuming and unpleasant task.

Other problems associated with these guns include, the air supply to the chopper portion of the gun often has to be turned on and off independently of the valving of the resin and catalyst. The trigger of the gun typically controls only the resin and catalyst whereas a separate air supply valve can be turned on for the chopper air supply. If the chopper air supply and the chopped fiberglass were not opened simultaneously with the flow of the resin/catalyst mixture, fiberglass fibers could be released into the environment where the work piece is being sprayed.

It is, therefore an object of the present invention to provide an improved spray gun.

It is a further object of the invention to provide a spray gun that is lightweight and easy for the operator to handle.

It is still another object of the invention to provide a spray gun with two independent piston mechanisms for the catalyst and the resin valving.

It is still a further object of the invention to provide a trigger mechanism that uses air to simultaneously open both the resin and catalyst pistons driven valves and also uses air to simultaneously close both the resin and catalyst positions driven valves.

It is yet a further object of the invention to provide a spray gun where leakage of the catalyst and/or resin can be detected readily by the operator.

It is still a further object of this invention to provide a spray gun in which the packing and/or O-ring seas can be easily adjusted from an exterior portion of the spray gun.

It is yet another object of the present invention to provide a spray gun wit seals and O-rings easily replaceable without completely disassembling the gun.

It is still a further object of this invention to provide a spray gun having a cartridge type packing seal that is easily replaceable without the typical digging of the packing material out of the spray gun orifice.

It is still yet a further object of this invention to provide a valve means to operate the air supply to the chopper valve in conjunction with the operation the resin and catalyst valves.

These and other objects are attained in the provision of the spray gun apparatus for a fiberglass spraying system having a resin valve and a catalyst valve operated by separate pistons and actuated simultaneously by a trigger actuated air control valve. The use of the dual pistons cuts down the weight and the size of the spray gun and provides a more reliable spray gun. Air opens and closes the pistons, therefore, there is no need for springs and no sticking of handle valves. However, springs can still be used as a back-up system. The trigger mechanism is a four way air valve in that it opens two valves and also closes two valves.

The spray gun includes a leak detection to determine when the packings and O-ring seals of the resin and catalyst valve need to be adjusted, repaired or replaced. The packing is easily adjustable from exterior of the spray gun by rotation of the resin valve seat. The O-ring seals are easily removable from the spray gun bý external separating the spool valve portion from the piston portion in order to be replaced quickly and efficiently. The packing is included in a cartridge type packing in order to quickly replace the entire packing seal. The catalyst valve controls the mixing of catalyst and a second air supply prior to spraying. Refinement air from the same air supply as used to actuate the resin and catalyst valves is controlled by a metering valve independent of the trigger actuated air control valve.

In a specially preferred embodiment of the subject invention, the catalyst piston further includes a portion which simultaneously opens an air valve to control the chopper air supply. This allows all of the raw materials to be controlled by pulling on a single trigger.

Other objects, advantages and novel features of the present invention will now become readily apparent upon consideration of the following descriptions of preferred embodiments in conjunction with the drawings.

DETAILED DESCRIPTION OF THE DRAWINGS

Figures 1, 1A:
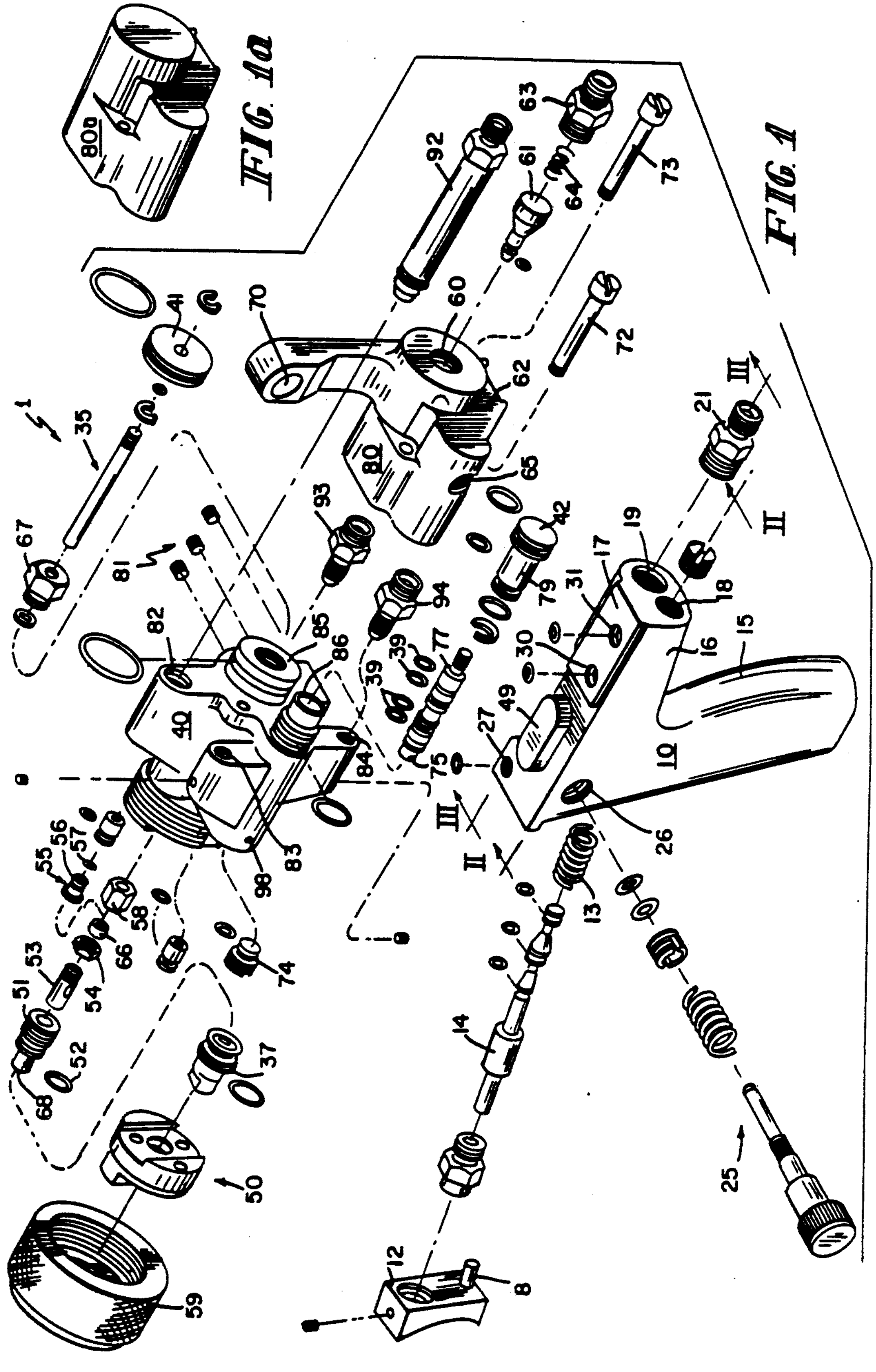
FIG. 1 is an exploded perspective view of a spray gun constructed in accordance with a preferred embodiment of the invention.
FIG. 1*a* is a perspective view of a rear head section without a chopper air supply connection as constructed in accordance with an additional preferred embodiment of the present invention.
Figure 2:
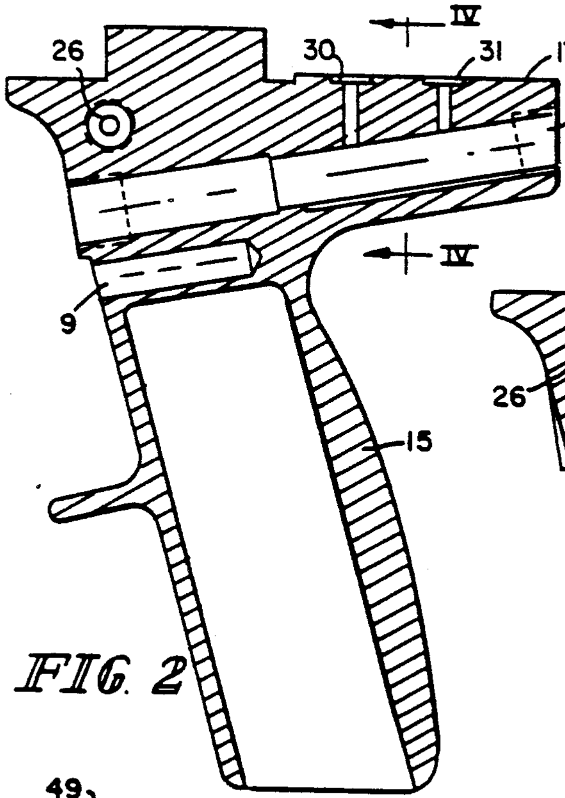
FIG. 2 is a cross-sectional of the handle section taken along lines II—II of FIG. 1.
Figure 3:
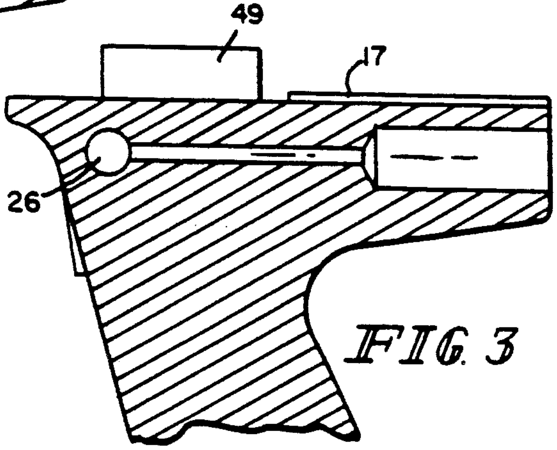
FIG. 3 is a cross-sectional view of the handle portion taken along lines III—III of FIG. 1.

FIG. 1 shows a preferred embodiment of the spray gun 1, having a chopper bracket and air supply to the chopper supply. The gun includes a handle section 10, a front head section 40, a rear head section 80, and a spray tip 50. The gun is assembled by positioning the front head section 40 on top of extruded portion 49 of the handle section 10. Set screws 81 are then tightened to secure, the front head section onto the handle section 10. The rear head section 80 is then slid into place abutting the front head section 40 with the fittings 85 and 86 on the back of the front head section 40 sliding into piston chambers bores 141 and 142 respectively (FIG. 6) of the rear head section 80. A raised portion 17 on the top of the handle functions as a guide for the longitudinal recess 62 in the bottom of rear head section 80. Raised portion 17 and recess 62 dove tail to limit vertical motion between the handle and rear head sections.

The rear head section 80 is properly positioned when corresponding ports 130 and 131 of section 80, are aligned with ports 30 and 31 of the handle section 10. Bolts 72 and 73 are slid through the rear head section 80 and screwed in to appropriate openings in the front head section 40 thereby securing the rear head section to the front head section. O-rings are provided at the attachment portions to provide an adequate sealing arrangement. Tip 50 is secured to front head section 40 by nut 59.

Figure 4:
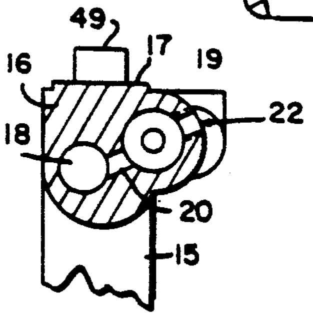
FIG. 4 is a cross-sectional view of the handle portion taken along lines IV—IV of FIG. 2.
Figure 5:
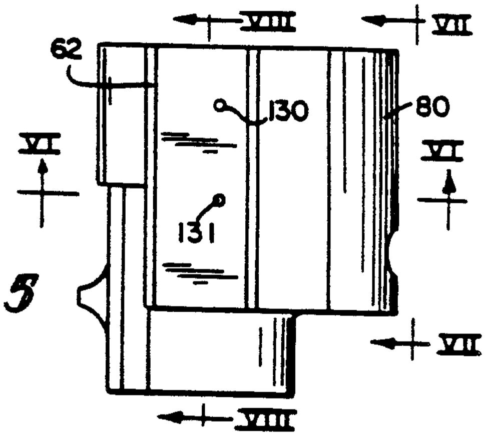
FIG. 5 is a bottom view of the rear head section of FIG. 1.

Referring to FIGS. 1–4 handle section 10 includes a grip portion 15 and a top portion 16 which includes two substantially horizontal bores 18 and 19 running from the rear gun to the front portion of the gun. Air is introduced into bore 19 from the rear of the handle 10 through fitting or port 21. Bore 19 is connected to bore 18 by passage 20 shown in FIG. 4. An air control valve 14 which is a spool valve controlled by the trigger 12 is inserted in bore 18 from the front of the handle. The position of the air control valve 14 provides air to either open or close the individual valves for the resin and catalyst in the front head section 40 by pistons in rear head section 80 via ports 30, 31, 130 and 131. Port 22 on top port 16 of the handle 10 showing FIG. 4 is an exhaust port connected to bore 18 which allows exhaust air to be discharged from one of the ports 30, 31 to the environment when the air is directed to the other port 30, 31 under the control of air supply 14. Guide 8 of trigger is received in bore 9 of handle 10. A spring 13 returns the trigger 12 and air control valve 14 to their deactivated position.

The air supply introduced into bore 19 also travels into the front head section 40 through a passage way 27, connected perpendicular to bore 19, where it provides air refinement for the spray configuration of the tip 50 of the gun. The air refinement air supply is controlled independent of trigger 12 and air supply valve 14 by air refinement metering valve 25 which is inserted into a bore 26, to the cylindrical bore 19. A single air supply at port 21 thus provides the means to control the opening and closing for the resin and catalyst piston valves and also provides air for the air refinement. This is possible because the small size of the two valves requires less air to operated than one larger valve of prior guns.

Figure 6:
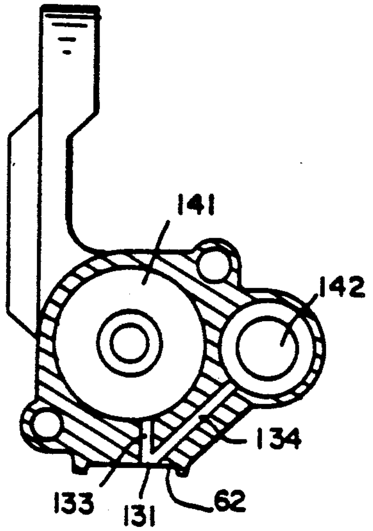
FIG. 6 is a cross-sectional view of the rear head section taken along lines VI—VI of FIG. 5.

Referring to FIGS. 1 and 5–8 the ports 30 and 31 on the top portion 16 of the handle 10 connect bore 18 to both piston chambers 141 and 142, in rear head section 80 in ports 130 and 131. Each port 130, 131 is connected to each piston chamber 141 and 142 by a "Y" shaped passages 133 and 134 respectively as illustrated in FIG. 6 for port 131. Pistons 41 and 42, which are connected to resin and catalyst valves 35 and 36 in front head section 40, slide in piston chambers 141 and 142 respectively.

When the operator pulls on trigger 12, air control valve 14 moves toward the rear of the gun connecting air from bore 19, passage 20 and bore 18 to ports 30, 130 to provide air to the front of pistons 41 and 42 to push them rearward and opening their respective valves 35 and 36. Simultaneously air control valve 14 connects ports 31, 131 to exhaust port 22 to exhaust the rear of pistons 41 and 42. This allows both resin and catalyst to flow to the tip 50 of the gun.

When the operator releases the trigger 112, spring 13 forces the trigger 12 and air control valve 14 forward, connecting port 30 to exhaust port 22 and connecting port 31 to the air supply. Air then pushes piston 41 and 42 forward and closing the resin valve 35 and the catalyst valve 36. The air supply thus provides closing and locking the resin and catalyst valves. Springs (not shown) can be used as a safety device to close the valves if the air supply is interrupted.

Figure 7:
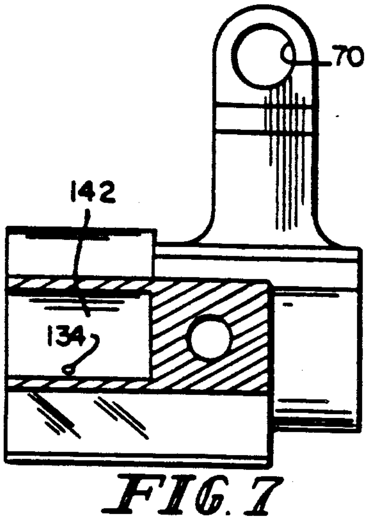
FIG. 7 is a cross-sectional view of the catalyst piston chamber taken along lines VII—VII of FIG. 5.
Figure 8:
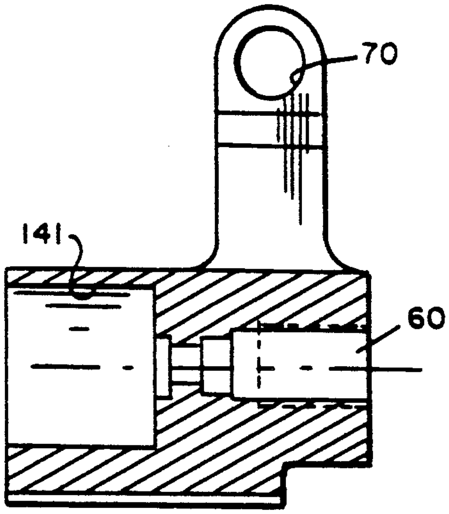
FIG. 8 is a cross-sectional view of the resin piston chamber taken along lines VIII—VIII of FIG. 5.
Figure 9:
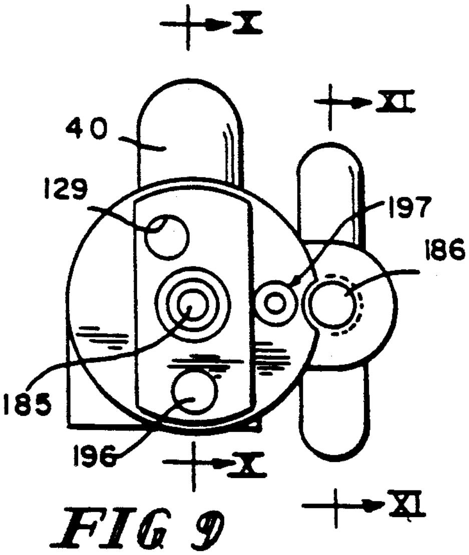
FIG. 9 is a front view of the front head section of FIG. 1.

The rear head section 80 includes chopper air spool valve 61 and an air supply fittings or port 63 in threaded bore 60. A passage 165 connects air supply discharge port 65 to bore 60 as illustrated in FIG. 7. Piston 41 which controls resin valve 35 also controls chopper air valve 61 to simultaneously open both valves. When the piston 41 is activated by air to close resin valve 35, spring 64 closes chopper air valve 61. A fitting (not shown) is connected at discharge port 65 and provided to the chopper air supply. This allows the chopper air supply to be activated simultaneously with the resin supply opened by the trigger 12 and trigger valve 14. Thus, the trigger valve 14 also opens the air supply to the chopper and controls all the raw materials going to the work piece. The chopper supply is secured to the rear head section 80 at opening 70.

FIG. *1a* shows a guns used in a two component system such as gelcoat application. In the gelcoat operation, there is no need for a chopper air supply or a means to attach the chopper assembly to the gun. The gelcoat system uses a combination of resin and catalyst sprayed unto a work piece. Thus, ports 60 and 62 may be eliminated or capped and chopper air valve 61 and arm having opening 70 are eliminated.

Referring to FIGS. 1 and 9–12, the resin is supplied to the gun in bore 82 of the front head section 40 through resin port 92. The resin is controlled by resin valve 35 in bore 185 which is sealed from resin port 92 by a novel cartridge type packing assembly 55. When resin valve 35, which is a needle valve, is opened, resin flows through port 92, bore 82, passage 182 through main packing retainer 53, through needle seat 51, and out nozzle 37 in tip 50 into the spray configuration directed towards a work piece. The spray is configured by air refinement in the tip.

The packing cartridge assembly 55 is made up of a needle valve seat 51 for mating with needle valve 35 extending through bore 185. An O-ring 52 provides the seal between the needle seat valve 51 and bore 185. The reduced portion of needle valve seat 51 which extends into the nozzle 37. The main packing retainer 53 is inserted in to the rear of the needle valve seat 51. A cartridge lock nut 54 is attached to the threaded end of the main packing retainer 53. A main packing 66 is held against the main packing retainer 53 by a packing press 56, and O-ring seal 57 provided within a packing housing 58. A packing retainer 67 is threadably received in the rear of packing housing 58 through port 85 to secure it to the front head section 40.

Figure 10:
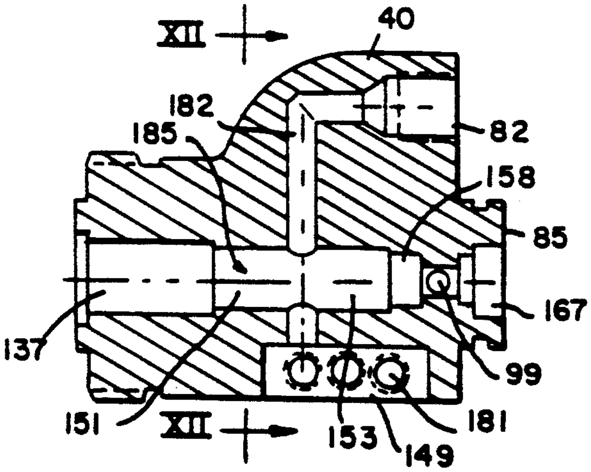
FIG. 10 is a cross-sectional view of the front head section taken along lines X—X of FIG. 9.

Referring to FIG. 10, the packing housing 58 is inserted into section 153 of bore 185. Packing retainer 67 is inserted into bore 167 and threadly received into packing-housing 58. O-ring 57, packing press 56 and main packing 66 are inserted into the packing housing 58. The assembled needle valve seat 51, O-ring 52, main packing retainer 53 and lock nut 54 are inserted into section 15 and 153 of bore 185. A screw driver is inserted into slot 68 at the front of needle valve seat 51 to screw needle valve seat 51 into threaded section 151 of bore 185. The nozzle 37 is inserted over the front end of handle valve seat 51. The tip 50 is inserted over nozzle 37 and secured to the front head portion 40 by nut 59. This provides a means to easily adjust and tighten the packing by turning the needle valve seat 51 with a screw driver from the exterior of the housing.

A separate bore 99 is provide in the flow head assembly 40 in bore 185 to indicate a leakage between the resin supply and the packing cartridge assembly 55. When resin is shown coming from port 99, it is an indication that the packing needs tightening. The packing can thus easily be tightened by providing a screwdriver into the slot 68 of needle valve tip 51 and simply turning it clockwise in order to tighten the packing within the gun. This is done without removing the entire portions of the gun and is done easily by an operator in the field. Port 99 then can be easily cleaned out with a small tool so that future leakage will be indicated as it edits the bore 99.

Figure 11:
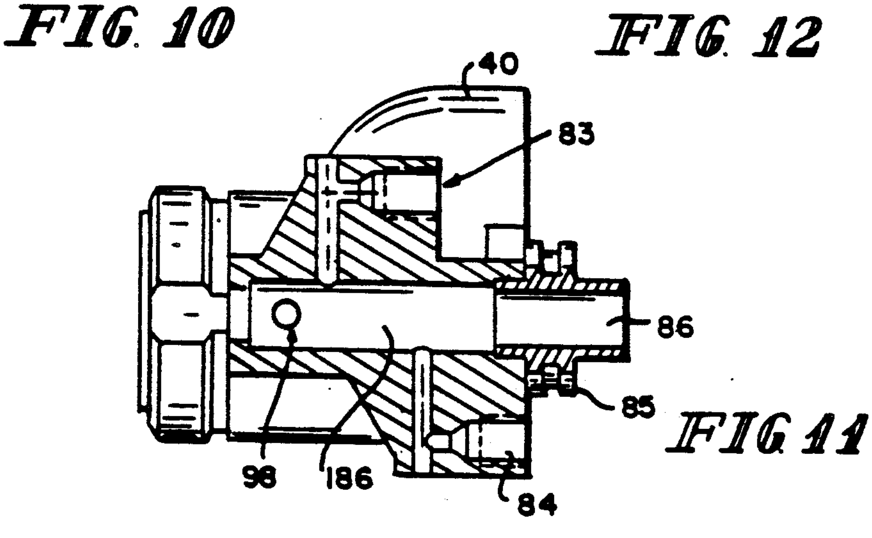
FIG. 11 is a cross-sectional view of the front head section taken along lines XI—XI of FIG. 9.

Referring to FIG. 11, the catalyst is introduced into the gun through fitting 93 which is connected to the front head section 40 at port 83. A separate air supply is introduced into the gun through fitting 94 which is connected to the front had section 40 at port 84. Catalyst valve 36, having a valve portion 77 in bore 186, controls both the catalyst which enters the gun through fitting 93 and the air which enters the gun through fitting 94. The catalyst valve 36 is a spool valve. When the piston 42 moves to the rear opening catalyst valve 36, resin and air are introduced and mixed to atomized the catalyst on its way to the tip mechanism 50 of the gun. The catalyst is atomized as it travels through an internal bore 186 and passageway 198 in front head section 40 shown in FIG. 12.

The discharge location of the atomized catalyst depends on the type of gun being operated. In a gun such as illustrated in FIG. 1 having a chopper, the catalyst is introduced on a bottom portion of the tip 50 from bore 196 connected to passage 198 so that the spray configuration is horizontally flat. This allows the spray to coat the fibers being sprayed from the chopper. In a gun used for gelcoat and associated with the rear head section of FIG. 1*a*, the atomized catalyst is introduced on a side or lateral portion of the tip 50 from bore 197 connected to passage 198 providing a vertically flat spray stream. In the gelcoat operation, the gun does not have fiberglass introduced into the stream which goes on to the work piece.

Also provided within the front head section 40 is a bore 98 connected to bore 86 which provides a leak detection system for seals of the catalyst portion of the gun. When catalyst is noticed coming out at bore 98, the O-ring seals 39 need to be changed. The O-ring section 77 of the piston valve 36 can easily be removed by removing the cap 74 threaded into the front of bore 186. After removing cap 74, a screwdriver is inserted into slot 75 of the catalyst valve 36 and the front portion 77 of the valve is threadably disengaged from the rear portion 79 of the catalyst valve 36 which includes the piston 42. The O-rings 39 can then be easily removed and replaced on the front portion 77 of the catalyst valve. The front piston 77 can then be threadly engaged into the rear portion 79 of the catalyst valve 36 by using a screwdriver within slot 75. This is easily done from the exterior of the gun without complete disassembly of the gun.

Figure 12:
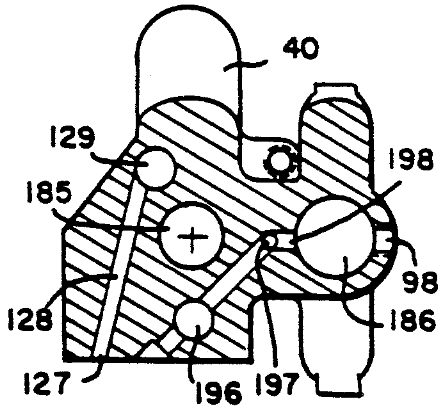
FIG. 12 is a cross-sectional view of the front head of section taken along lines XII—XII of FIG. 10.

Referring to FIG. 12, the refinement air from port 27 of the handle is received in port 127 of the front head section. Passages 128 and 129 provide the refinement air to the tip 50.

Thus it can be seen that the objects of the invention have been achieved. Although the present invention has been described in detail, the same as by way of illustration and example only and is not to be taken by way of limitation. The spirit and scope of the present invention are to be limited only by the terms of the appended claims.

What is claimed:

1. A packing cartridge assembly for use in a bore of a spray gun comprising:

a packing housing to be inserted through a first end of said bore, a packing press and a packing substance within said packing housing, adjustment means to be threadably received in said first end of said bore for adjustable compressing said packing press and said packing substance against said packing housing, and tool means on said adjustment means for receiving a tool inserted at first end of said bore to provide rotation of said adjustment means causing the packing substance to be adjustably compressed.

2. The assembly of claim 1, further wherein said adjustment means includes a packing retainer and a valve seat, said valve seat including a threaded portion to be threadably received in said bore and said tool means to press said packing retainer against said packing substance.

* * * * *